United States Patent

Ohashi et al.

[11] Patent Number: 4,893,524
[45] Date of Patent: Jan. 16, 1990

[54] HST SYSTEM AXLE DRIVING APPARATUS

[75] Inventors: Ryota Ohashi, Kobe; Masahisa Kawamura, Amagasaki, both of Japan

[73] Assignee: Kanzaki Kokyukoki Mfg. Co. Ltd., Japan

[21] Appl. No.: 271,311

[22] Filed: Nov. 15, 1988

[30] Foreign Application Priority Data

Nov. 21, 1987 [JP] Japan .................. 62-177885[U]

[51] Int. Cl.$^4$ .............................................. F16H 47/04
[52] U.S. Cl. ........................................ 74/687; 60/490; 60/487
[58] Field of Search ............... 74/687, 606 R; 60/487, 60/488, 489, 490, 491, 492

[56] References Cited

U.S. PATENT DOCUMENTS

| | | | |
|---|---|---|---|
| 1,481,385 | 1/1924 | Nilson et al. | 188/18 R |
| 2,791,912 | 5/1957 | Bixby | 74/344 |
| 3,196,696 | 7/1965 | Ritter | 74/15.63 |
| 3,339,662 | 9/1967 | Hanson et al. | 180/54.1 |
| 3,494,225 | 2/1970 | Binder et al. | 74/700 |
| 3,528,322 | 9/1970 | Schou | 74/687 |
| 4,046,029 | 9/1977 | Sugden | 74/687 |
| 4,244,279 | 1/1981 | Stewart et al. | 60/487 X |
| 4,258,548 | 3/1981 | Hall, III et al. | 60/487 X |
| 4,281,942 | 8/1981 | Gaeckle et al. | 403/38 |
| 4,292,855 | 10/1981 | Murayama | 74/15.4 |
| 4,304,141 | 12/1981 | Tone et al. | 74/15.2 |
| 4,449,424 | 5/1984 | Hauser | 74/606 R |
| 4,513,834 | 8/1985 | Hayashi et al. | 180/70.1 |
| 4,627,237 | 12/1986 | Hutson | 60/490 X |
| 4,691,802 | 9/1987 | Ishimori et al. | 60/490 X |

FOREIGN PATENT DOCUMENTS 55119461 2/1954 Japan .
57136049 2/1956 Japan .

Primary Examiner—Dirk Wright
Attorney, Agent, or Firm—Saidman, Sterne Kessler & Goldstein

[57] ABSTRACT

An HST type axle driving apparatus integrally assembling a hydraulic pump and a hydraulic motor at an HST type driving speed changing unit, in which a transmission casing, a pump casing and a motor casing are formed of soft metal material, such as aluminum cast, whereby mechanically processed portions are eliminated as much as possible and the manufacturing cost is reduced. A wall of the transmission casing that journals a motor shaft and a pump shaft, through which oil passages are perforated, is formed of hard metal material, such as cast iron. The parts of hard metal material are assembled by being enclosed by the casing of soft metal material.

4 Claims, 7 Drawing Sheets

HST SYSTEM AXLE DRIVING APPARATUS

FIELD OF THE INVENTION

The present invention relates to an HST system axle driving apparatus which divides an HST (hydro-static-transmission) type driving speed changing unit into a hydraulic pump and a hydraulic motor and assembles them integrally in a transmission casing.

DESCRIPTION OF THE PRIOR ART

The prior art of dividing the HST type driving speed changing unit into the hydraulic pump and hydraulic motor and assembling them integrally in the transmission casing is disclosed in the U.S. patent application Nos. 179630, 212017, and 212173 filed by the inventor of the present invention.

When the HST type driving speed changing unit is divided into the hydraulic pump P and hydraulic motor M and assembles them integrally into the transmission casing which comprises a left-hand half casing and a right-hand half casing so that all the casings including the pump casing and motor casing are formed of aluminum die casting, mechanical processing for the unit can be eliminated and manufacturing cost is reduced. However, when an oil passage, through which pressure oil is delivered between the hydraulic pump and the hydraulic motor, is perforated in an aluminum casting, since the aluminum casting is smaller in strength when subjected to high pressure, there is a fear that the oil passage may be broken down by such pressure.

The present invention has been designed in order to improve the above point.

SUMMARY OF THE INVENTION

The present invention is directed to provision of the HST integral type axle driving apparatus, which integrally assembles a hydraulic pump and a hydraulic motor at an HST type driving speed changing unit, constitutes a transmission casing, a pump casing and a motor casing, of a soft metal material, such as aluminum casting, thereby eliminating mechanically processing parts as much as possible and reducing the manufacturing cost.

However, since the portions of providing oil passages and bearings require strength, walls of the transmission casing, through which the oil passages are perforated or a motor shaft and a pump shaft are journalled, are composed of a hard metal material, such as cast iron, the parts of hard metal materail being covered with casings of the soft metal material.

A portion between the pump casing and the side surface of the transmission casing is partitioned to form a supply oil tank, thereby enabling a compact transmission casing.

DESCRIPTION OF THE PREFERRED EMBODIMENTS

Next, explanation will be given on embodiments of the invention shown in the accompanying drawings.

Figure 1:
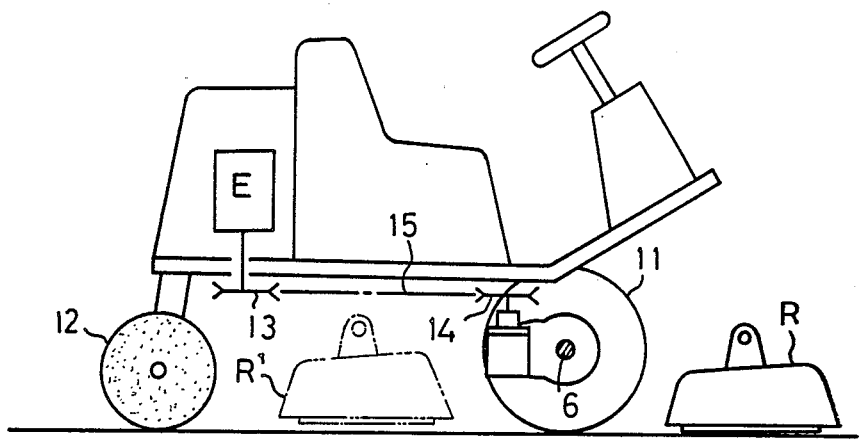
FIG. 1 is an overall side view of a mower tractor loading thereon an HST integral type axle driving apparatus of the invention.

FIG. 1 is an overall side view of a mower tractor loading thereon the HST type axle driving apparatus of the invention.

In the drawing, front wheels 11 and rear wheels 12 support a car body frame, an engine E supported on the body frame is of a vertical crank shaft system, and a driving force is transmitted through a belt 15 to an input pulley 14 provided at the HST integral type axle driving apparatus of the invention from an output pulley 13 attached to the vertical crank shaft.

The front wheels 11 are driving wheels, and the HST integral type axle driving apparatus of the invention drives first and second axles 6L and 6R respectively for the front wheels.

The rear wheels 12 are steering control wheels and steered by a steering handle.

A mower unit R is mounted between the front wheels 11 and the rear wheels 12, or in front of the front wheels 11.

Figure 2:
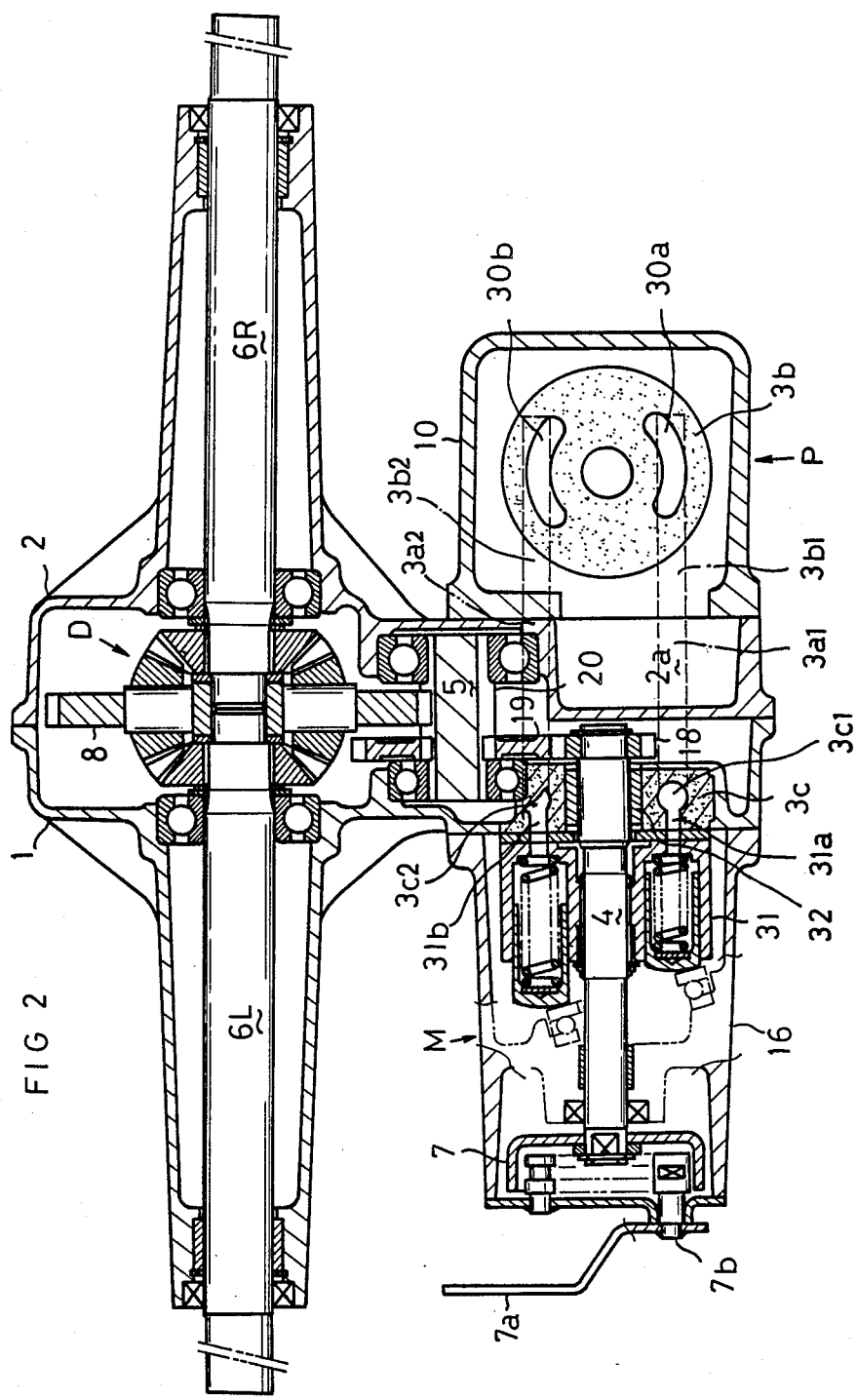
FIG. 2 is a sectional plan view of an embodiment of the HST integral type axle driving apparatus of the invention.
Figure 3:
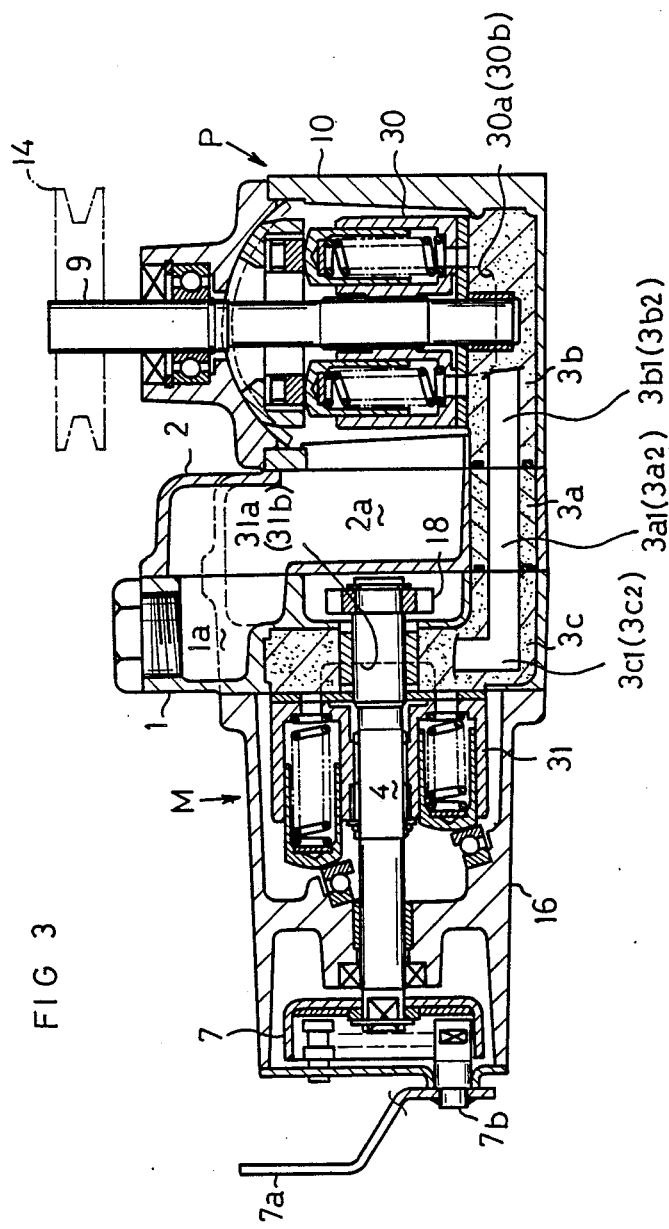
FIG 3 is a sectional rear view of portions of a hydraulic pump P and a hydraulic motor M taken at the same point as FIG. 2.

FIG. 2 is a sectional plan view of the HST integral type axle driving apparatus and FIG. 3 is a sectional rear view of portions of a hydraulic pump P and a hydraulic motor M of the same.

A transmission casing of HST integral type axle driving apparatus of the invention comprises a left-hand or first half axle casing 1 and a right-hand or second half axle casing 2.

In the embodiment shown in FIGS. 2 and 3, a motor casing 16 for the hydraulic motor M is attached to one side surface of part of the left-hand half casing 1 housing therein the transmission unit, a pump casing 10 for the hydraulic pump P being attached to one side surface of the right-hand half casing 2.

The hydraulic pump P is provided in the pump casing 10 as shown in FIG. 3, the input pulley 14 shown in FIG. 1 being fixed to a pump shaft 9 of hydraulic pump P, so that the pump shaft 9 is rotated to deliver pressure oil variable of discharge amount from the hydraulic pump P into the hydraulic motor M provided in the motor casing 16.

A torque output from the hydraulic motor M is transmitted from the motor shaft 4 to an output gear 18 fixed thereto in the left-hand half casing 1.

A torque of the output gear 18 is transmitted to the transmission unit journalled to the left-hand and right-hand half casings 1 and 2, in other words, a larger diameter gear 19 on a countershaft 5, and then a smaller diameter gear 20 thereon engages with a ring gear 8 at a differential gear unit D constituted at the abutting portion between the left and right axles 6L and 6R within the transmission casing.

Therefore, the torque of motor shaft 4 is decelerated by a gear train of the output gear 18, larger diameter gear 19, smaller diameter gear 20 and ring gear 8 and transmitted to the axles 6L and 6R from the differential gear unit D.

In the above-mentioned entire construction, the other side of the motor casing 16 reverse to the one side thereof through which the motor shaft 4 enters the left-hand half casing 1, is extended, so that a braking device 7 is disposed at the extension.

The braking device 7, as shown in FIG. 3, expands brake shoes in a brake drum by a brake arm 7a and a brake cam 7b, thereby enabling braking action.

The braking device 7 is enclosed with the extension integral with the motor casing 16 for the hydraulic motor M so that the brake casing is integral with the motor casing 16.

Also, as shown in FIGS. 2 and 3, the transmission casing constituted of the left-hand half casing 1 and right-hand half casing 2 is often lubricated therein by grease at the supporting portions of the axles 6L and 6R, counter shaft 5 and motor shaft 4. Hence, for the sake of a case where no lubricating oil is disposed in the transmission casing, the supply oil tank 2a at the HST type driving speed changing apparatus is formed within the right-hand half casing 2, in other words, a portion between the output gear 18 and the opposite side of the right-hand half casing 2 is partitioned to thereby form a separate chamber of supply oil tank 2a.

The pump casing 10 and supply oil tank 2a at the right-hand half casing 2 communicates with each other so that when operating oil circulating between the hydraulic pump P and the hydraulic motor M is short, the operating oil in the supply oil tank 2a is used.

As shown in FIG. 3, the supply oil tank 2a communicates at the upper portion thereof with a supply oil tank 1a provided at the upper portion of the left-hand half casing 1, thereby increasing capacity of supply oil. An oil filling plug screws with the upper wall of the supply oil tank 1a.

The left-hand half casing 1, right-hand half casing 2, motor casing 16 and pump casing 10 are formed of aluminum die casting, thereby eliminating mechanically processed portions as much as possible and lowering the manufacturing cost.

In a case of aluminum casting, however, when an oil passage connecting the hydraulic pump with the hydraulic motor is perforated, there is no problem for the usual operating oil pressure, but if abnormally high pressure oil acts on the oil passage, there is the danger that the pressure oil pierces the wall of oil passage of aluminum material so as to leak therefrom.

The present invention forms the portion having no oil passage of aluminum casting, but those through which the oil passages are perforated are formed of cast iron.

Cast iron oil passage portions 3c, 3a and 3b constituting the oil passages are used at the outer peripheral portions thereof as cores when the left-hand half casing 1, right-hand half axle casing 2 and pump casing 10 are cast-molded, and coated with aluminum material, thereby constituting internal chill.

At the hydraulic pump P, the bottom of a cylinder block 30 housing therein a plurality of pistons abuts against the upper surface of the cast iron oil passage 3b at the pump casing 10. Two high pressure and low pressure oil passages $3b_1$ and $3b_2$ perforating inside the oil passage 3b communicate with each other and semicircular oil passages 30a and 3b open at the upper surface of oil passages $3b_1$ and $3b_2$ connect with a discharge port and a suction port at the cylinder block 30.

A cylinder block 31 at the hydraulic motor M comes at the right side surface in the drawing into close contact with the left side surface of the cast iron oil passage 3c at the left-hand half casing 1 and a suction port and a discharge port of the cylinder block 31 connect with the high pressure and low pressure oil passages $3c_1$ and $3c_2$ through semicircular motor cylinder block oil passages 31a and 31b open at the side surface thereof.

The motor shaft 4 is stably supported to the cast iron oil passage 3c through a bearing bush 32.

The cast iron oil passage 3a at the right-hand half casing 2 constitutes axle casing oil passages $3a_1$ and $3a_2$ for connecting the pump casing cast iron oil passage 3b at the pump casing 10 with the cast iron oil passage 3c at the left-hand half casing 1.

Figure 4:
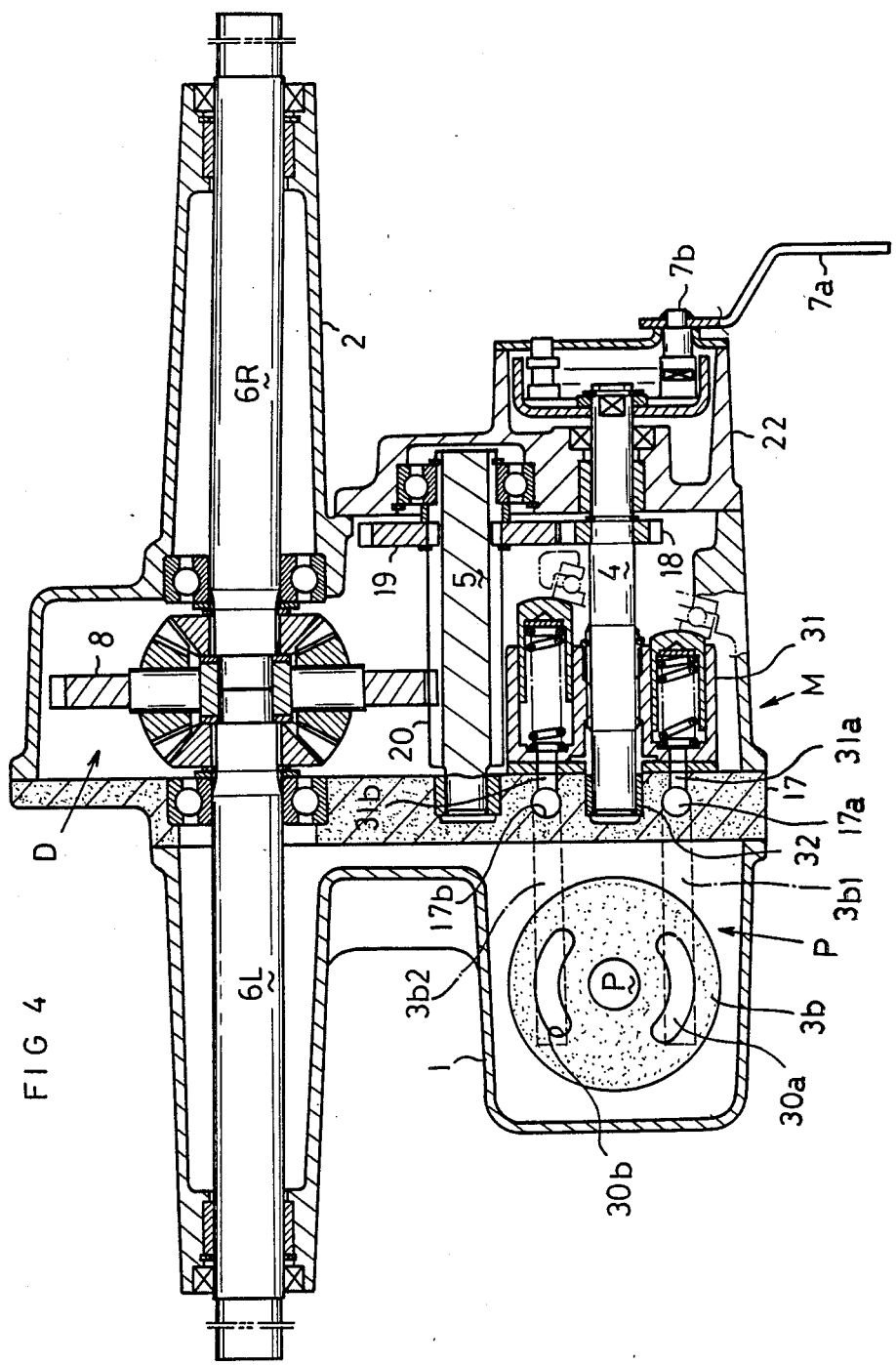
FIG. 4 is a sectional plan view of a modified embodiment of the HST integral type axle driving apparatus, in which an oil passage plate of cast iron is sandwiched between a left-hand half casing and a right-hand half casing, the hydraulic pump being disposed in the left-hand half casing and the hydraulic motor in the right-hand half casing.
Figure 5:
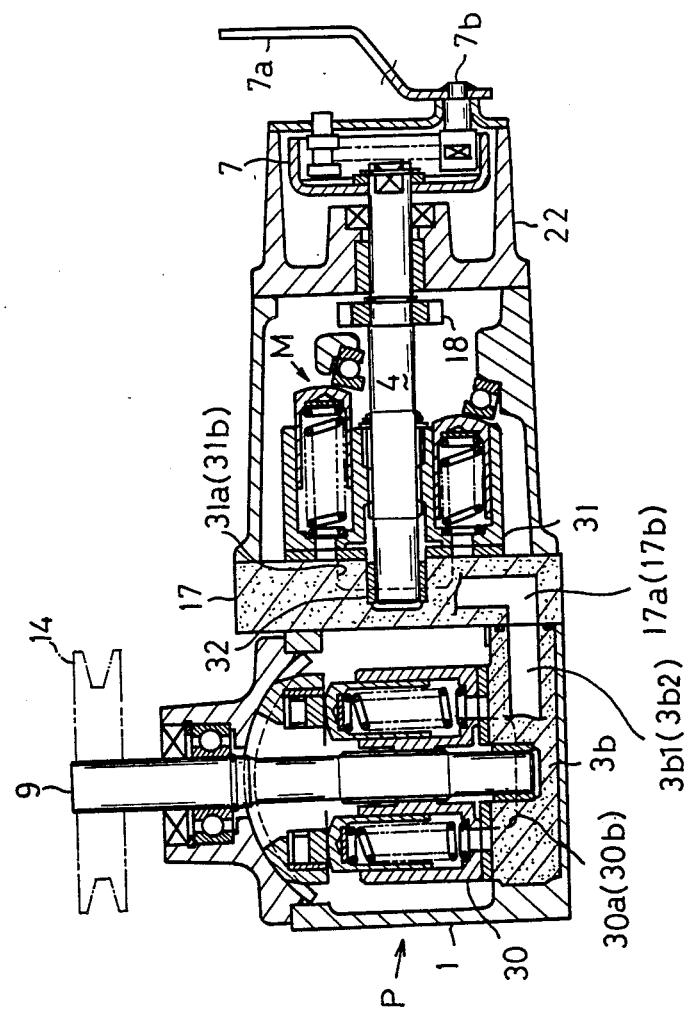
FIG. 5 is a sectional rear view of the FIG. 4 embodiment.

FIG. 4 is a sectional plan view of a modified embodiment of the invention, in which a cast iron oil passage plate 17 is sandwiched between the left-hand half casing 1 and the right-hand half casing 2, a hydraulic pump P is disposed in the left-hand half casing 1, and a hydraulic motor M is disposed in the right-hand half casing 2, and FIG. 5 is a sectional rear view of the same.

In the embodiment shown in FIGS. 4 and 5, both the hydraulic pump P and hydraulic motor M are disposed in the left-hand half casing 1 and right-hand half casing 2 respectively, no exclusive casing being provided. A bearing lid 22 is provided at the right-hand side of right-hand half casing 2 so as to journal an output end of a motor shaft 4 at the hydraulic motor M, the braking device 7 being provided at the right-hand end of motor shaft 4.

The braking device 7 is attached with a brake cam 7b and a brake arm 7a as the same as the former embodiment.

The motor shaft 4 is journalled at the left end shown in the drawing to the cast iron oil passage plate 17 through a bearing 32, and at the right end to the bearing lid 22.

An outer gear 18 is provided at an intermediate portion of the motor shaft 4 and engages with a larger diameter gear 19 on a counter shaft 5, and a smaller diameter gear 20 thereon drives a ring gear 8 at a differential gear unit D.

The counter gear 5 is supported by the cast iron oil passage plate 17 and bearing lid 22.

In this constitution, the cast iron oil passage plate 17 is provided between the left-hand half casing 1 and the right-hand half casing 2 laterally open respectively, and at the right side surface are perforated semicircular oil passages 31a and 31b communicating with a suction port and a discharge port at the cylinder block 31 and two high pressure and low pressure oil passages 17a and 17b in order to bring a cylinder block 31 at the hydraulic motor M into close contact with the cast iron oil passage plate 17.

As shown in FIG. 5, a cast iron oil passage block 3b provided with oil passages $3b_1$ and $3b_2$ communicating with the oil passages 17a and 17b in the cast iron oil passage plate 17 is formed in internal chill within the left-hand half casing 1, and at the upper surface of the cast iron oil passage block 3b are perforated and open semicircular oil passages 30a and 30b communicating with a suction port and a discharge port of the cylinder block 30 in order to bring the cylinder block 30 at the hydraulic pump P into close contact with the oil passage block 3b.

Such constitution enables the oil passages between the hydraulic pump P and the hydraulic motor M to be provided in the cast iron members.

Also, the motor shaft 4 is provided at the right-side end in the drawing with a braking device 7, a brake casing thereof being integrally projecting from the bearing lid 22.

Figure 6:
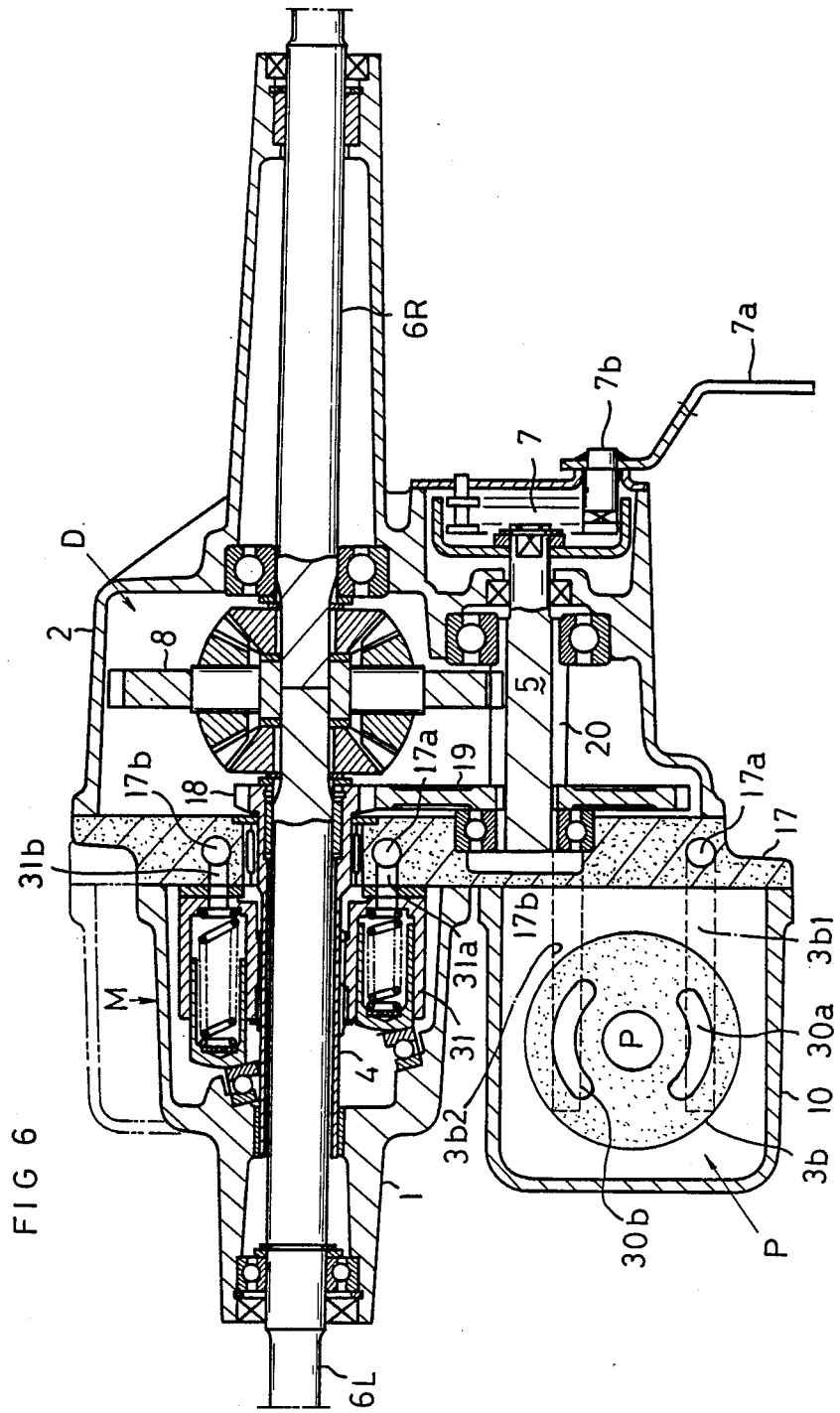
FIG. 6 is a sectional plan view of another modified embodiment of the HST integral type axle driving apparatus, in which the hydraulic motor is provided at a portion of journalling an axle 6L in the left-hand half casing and a pump casing of the hydraulic pump is provided at a portion of the oil passage plate disposed between the left-hand half casing and the right-hand half casing and projecting from the left-hand half casing.
Figure 7:
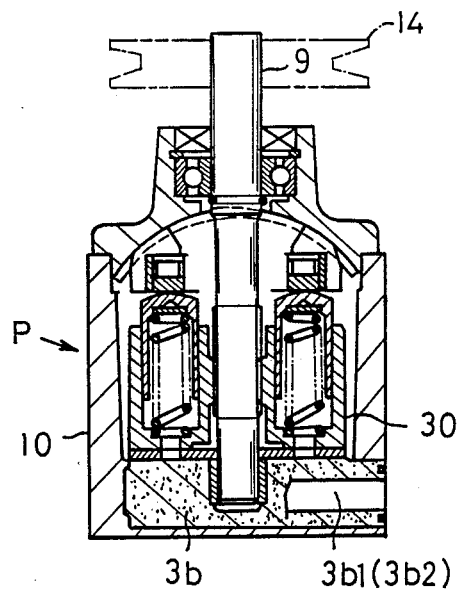
FIG. 7 is a sectional rear view of the hydraulic pump of the FIG. 6 embodiment.
Figure 8:
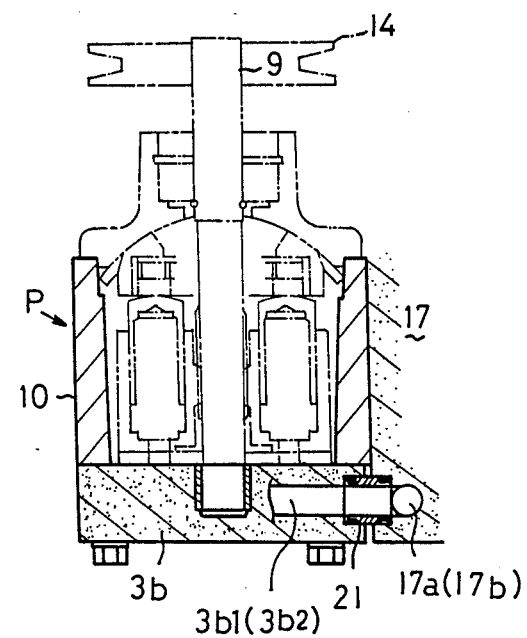
FIG. 8 is a sectional rear view of still another modified embodiment of the HST integral type axle driving apparatus, showing a cast iron oil passage block at the pump casing.

FIG. 6 is a sectional plan view of another modified embodiment of the HST type axle driving apparatus of the invention, in which a hydraulic motor M is provided at a portion of the left-hand half casing 1 where an axle 6L is journalled and a pump casing 10 for a hydraulic pump P is attached to a portion of a cast iron oil passage plate 17 sandwiched between the left-hand half casing 1 and a right-hand half casing 2 and projecting from the left-hand half casing 1, FIG. 7 is a sectional rear view of a hydraulic pump P of the same, and FIG. 8 is a sectional rear view of still another modified embodiment of the invention, showing only a cast iron oil passage block 3b at the pump casing.

In the embodiment in FIGS. 6 and 7, the hydraulic motot M is superposed on the outer periphery of the axle 6L, and a cylinder block 31 at the hydraulic motor M rotates in close contact with the left side surface of the cast iron oil passage plate 17 as shown, so that a suction port and a discharge port of the cylinder block 31 communicate with oil passages 17a and 17b at the cast iron oil passage plate 17 through semicircular oil passages 31a and 31b.

The cylinder block 30 is in close contact at the cylinder block 30 thereof with the upper surface of a cast iron oil passage block 3b provided at the lower portion of the pump casing 10 and pressure oil at a suction port and a discharge port of the cylinder block 30 is delivered from semicircular oil passages 30a and 30b to oil passages 17a and 17b at the cast iron oil passage plate 17 through oil passages $3b_1$ and $3b_2$, thereby being delivered to the suction port and discharge port at the cylinder block 31 of hydraulic motor M.

The power is transmitted from an output gear 18 provided at the outer periphery of the axle 6L to a ring gear 8 at a differential gear unit D through a larger diameter gear 19 on a counter shaft 5 and a smaller diameter gear 20.

In addition, as shown in FIG. 7, in a case where the cast iron oil passage block 3b is formed in internal chill within the pump casing 10, the cast iron oil passage block 3b after formed in the internal chill need be mechanically processed at the upper surface with which the cylinder block 30 comes into close contact. In the embodiment in FIG. 8, a pump casing 10 is open at the bottom, the cylinder block 30 is previously mechanically processed to have its close-contact surface, so that a separate cast iron oil passage block 3b can be fixed in close contact with the pump casing 10 through set screw bolts.

Alternatively, when adhesion cannot be obtained between the cast iron oil passage block 3b and the side surface of cast iron oil passage plate 17, a connecting oil passage 21 may be interposed between the oil passage block 3b and the oil passage plate 17.

The present invention constituted as above-mentioned has the following advantages.

Since the entire casing is formed of soft metallic material, such as aluminum cost, the HST integral type axle driving apparatus of the invention is small-sized, reduced in the mechanically processed portion, and metallic molded, thereby being inexpensive to produce. Also, only the oil passages, through which the hydraulic pump P communicates with the hydraulic motor M, are perforated in the cast iron oil passage blocks 3c, 3a and 3b and the cast iron oil passage plate 17, which are formed of hard metal material, whereby even when the oil passages are subject to abnormally high pressure, the danger of piercing the wall of oil passage as the oil passage perforated at the casing itself of soft metal material, such as aluminum cast, can be avoided.

Also, since the cast iron oil passage blocks 3c, 3a and 3b are disposed in the state of internal chill, the transmission casing M in the manufacturing process thereof can be constructed in a manner of enclosing the cast iron oil passage blocks 3c, 3a and 3b in the transmission casing. Hence, the HST integral type axle driving apparatus of invention can be compact and improved in the appearance. Also, since the oil passages are formed by casting in the cast iron oil passage blocks 3c, 3a and 3b, there is no need of mechanically processing the aluminum casing to form the oil passages.

In the process of forming internal chill by attaching the cast iron oil passage blocks 3c, 3a and 3b and the cast iron oil passage plate 17 in close contact with the side surface or the bottom surface open at the casing formed of soft metal material, such as aluminum cast, it is required to mechanically process the close contact surface of the cylinder block 31 or 30 after finish of the process, but in the present invention, if the pump casing or the motor casing is smaller in its assembly inlet, the cast iron oil passage blocks 3c, 3a and 3b and cast iron oil passage plate 17 are previously processed and then attached to the opening at the side surface or the bottom surface of the casing, thereby facilitating the mechanically processing for the close-contact surface of the cylinder block.

Also, in the present invention, one axial end of the motor shaft is supported by the hard metal material so as to stabilize the bearing condition, thereby enabling the braking device to be provided at the other axial end of the same. Moreover, since the braking device is directly provided at the motor shaft of low torque prior to deceleration, thereby enabling a braking device of small braking capacity to be used and made compact.

When the transmission casing forms one side wall and the other side wall of the hard metal material as the mounting surface for the hydraulic motor and hydraulic pump, a dead space is created between the output gear at one axial end of motor shaft journalled to one side surface of the transmission casing, the dead space being partitioned to be used as a supply oil tank for the HST type driving speed changing unit, thereby enabling the apparatus to be made compact without a separate supply oil tank provided at the exterior of the same.

Although several embodiments have been described, they are merely exemplary of the invention and not to be constructed as limiting, the invention being defined solely by the appended claims.

What is calimed is:

1. A hydrostatic-transmission-type axle driving apparatus, comprising
   a transmission casing including a first axle casing and a second axle casing;
   a first axle disposed within said first axle casing; a second axle disposed within said second axle casing;
   a motor casing attached to a side surface of said first axle casing;
   a hydraulic motor disposed within said motor casing, said hydraulic motor including a motor cylinder block and a motor shaft disposed in parallel to said first and second axles;
   a motor cylinder block oil passage formed in said motor cylinder block;
   a pump casing attached to a side surface of said second axle casing;
   a hydraulic pump disposed within said pump casing, said hydraulic pump including a pump cylinder block disposed at a bottom surface of said pump casing, and a pump shaft disposed perpendicular to said first and second axles;
   a pump cylinder block oil passage formed in said pump cylinder block;
   a pump casing oil passage formed in said pump casing in communication with said pump cylinder block oil passage; and
   an axle casing oil passage formed in said first and second axle casings, said axle casing oil passage connecting said pump casing oil passage with said motor cylinder block oil passage.

2. A hydrostatic-transmission-type axle driving apparatus, as set forth in claim 1, further comprising
   an output gear, having a torque, fixed to said motor shaft, the torque of said output gear being transmitted to a differential gear unit disposed between said first and second axles by a speed reduction transmission.

3. A hydrostatic-transmission-type axle driving apparatus, as set forth in claim 2, further comprising a supply oil tank formed within said second axle casing.

4. A hydrostatic-transmission-type axle driving apparatus, as set forth in claim 3, wherein said supply oil tank and said pump casing communicate with one another to supply oil to said hydraulic motor and said hydraulic pump.

* * * * *

UNITED STATES PATENT AND TRADEMARK OFFICE
CERTIFICATE OF CORRECTION

PATENT NO. : 4,893,524

DATED : January 16, 1990

INVENTOR(S) : Ryota Ohashi, et al.

It is certified that error appears in the above-identified patent and that said Letters Patent is hereby corrected as shown below:

Column 1, line 50, delete "materail" and insert --material-- therefor;

Column 4, line 1, after "half" insert --axle--;

Column 5, line 35, delete "motot" and insert --motor-- therefor; and

Column 6, line 11, delete "cost" and insert --cast-- therefor.

Signed and Sealed this

Twenty-ninth Day of October, 1991

*Attest:*

HARRY F. MANBECK, JR.

*Attesting Officer*   *Commissioner of Patents and Trademarks*